C. H. KRAPF.
ADJUSTABLE SLICING KNIFE.
APPLICATION FILED JULY 5, 1917.
1,305,906.
Patented June 3, 1919.
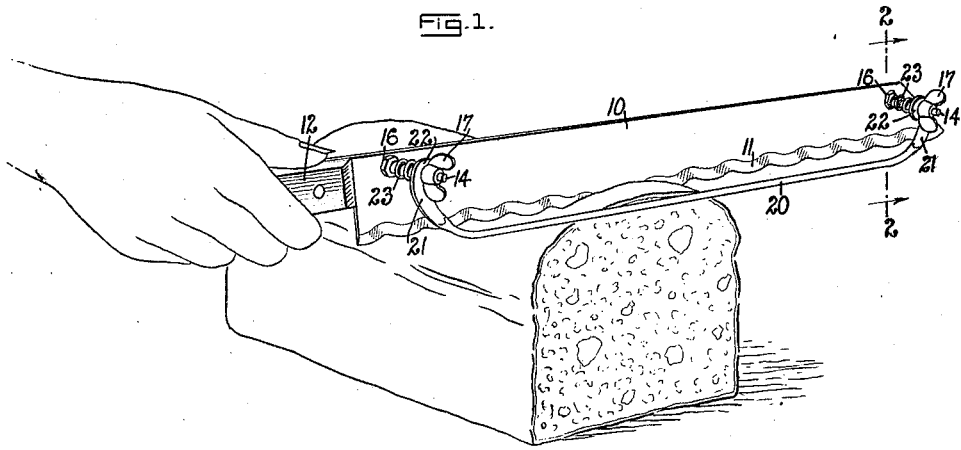
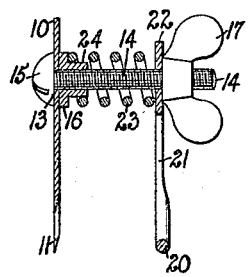
WITNESSES
INVENTOR
Charles H. Krapf
BY
ATTORNEYS

UNITED STATES PATENT OFFICE.

CHARLES H. KRAPF, OF BROOKLYN, NEW YORK.

ADJUSTABLE SLICING-KNIFE.

1,305,906.     Specification of Letters Patent.     Patented June 3, 1919.

Application filed July 5, 1917. Serial No. 178,617.

*To all whom it may concern:*

Be it known that I, CHARLES H. KRAPF, a citizen of the United States, and a resident of the city of New York, borough of Brooklyn, in the county of Kings and State of New York, have invented a new and Improved Adjustable Slicing-Knife, of which the following is a full, clear, and exact description.

The invention is a slicing knife particularly designed for cutting slices of bread, meat, vegetables and the like of any desired thickness. The details of construction, operation and arrangement of parts are as hereinafter described with reference to the accompanying drawing in which—

Figure 1 is a perspective view of the adjustable slicing knife in position for cutting off a slice of bread from a loaf of bread;

Fig. 2 is an enlarged transverse section of the same on the line 2—2 of Fig. 1;

A knife blade 10 shown in the drawing is provided with the usual wavy cutting edge 11 and with a handle 12 adapted to be taken hold of by the user for manipulating the knife when cutting slices from a loaf of bread or other article. The knife blade 10 illustrated in Figs. 1 and 2 is provided adjacent the back and near the front and rear ends with transverse apertures 13 through which pass bolts 14 having heads 15 seated on the rear face of the knife blade 10. On the bolts 14 screw fastening lock nuts 16 seated against the outer face of the knife blade 10 to securely fasten the bolts 14 in place on the knife blade 10, the bolts projecting at right angles from the front face of the knife blade 10. On the outer ends of the bolts 14 screw wing nuts 17.

A gage rod 20 is arranged parallel to the knife blade 10 and is located to one side of the front cutting edge 11 and the said gage rod 20 terminates in upwardly extending ends 21 preferably flattened and terminating in flat eyes 22 slidably engaging the bolts 14 immediately in the rear of the wing nuts 17. The rear faces of the eyes 22 are pressed on by the outer ends of springs 23 coiled around the bolts 14 and seated at the rear ends on the fastening or locking nuts 16, see Fig. 2. The fastening or locking nuts 16 are preferably provided with cylindrical offsets 24 projecting into the openings of the coil springs 23 to hold the latter in central relation relative to the bolts 14.

By the arrangement described the gage rod 20 is held in parallel relation to the cutting edge 11 of the knife blade 10 and in using the knife for cutting a slice off a loaf of bread, for instance as shown in Fig. 1, the gage rod 20 is engaged with the end of the loaf of bread to gage the thickness of the slice cut by the cutting edge 11 of the knife blade 10. When it is desired to increase or decrease the thickness of the slice it is only necessary for the user to turn the wing nuts 17 correspondingly outward or inward with a view to adjust the gage rod 20 farther from or nearer to the cutting edge 11 of the knife blade 10. It is understood that the springs 23 hold the eyes 22 of the gage rod 20 at all times against the inner faces of the wing nuts 17 and when the latter are adjusted on the bolts 14 then a corresponding adjustment of the gage rod 20 takes place.

Having thus described my invention I claim as new, and desire to secure by Letters Patent,

An adjustable slicing knife comprising in combination a handled knife blade provided with apertures adjacent the back near the ends of the blade, bolts engaging the said apertures and having heads seated on the rear face of the knife blade, the bolts projecting from the front face of the knife blade, lock nuts screwing in the said bolts and against the outer face of the blade to securely hold the bolts in place on the knife blade, wing nuts screwing on the outer ends of the said bolts, a gage rod disposed parallel to one side of the cutting edge of the knife blade, and having upturned ends terminating in eyes slidably engaging the said bolts, and springs coiled on the bolts and having their inner ends seated on the said lock nuts and having their outer ends bearing against the inner faces of the said eyes.

CHARLES H. KRAPF.

Copies of this patent may be obtained for five cents each, by addressing the "Commissioner of Patents, Washington, D. C."